United States Patent [19]

Healey et al.

[11] Patent Number: 4,670,278
[45] Date of Patent: Jun. 2, 1987

[54] PROCESS FOR THE CONDENSATION OF A VOLATILE-RICH VAPOR STREAM

[75] Inventors: John C. Healey; Anthony Wragg, both of Banbury, England

[73] Assignee: General Foods Limited, Banbury, England

[21] Appl. No.: 278,535

[22] Filed: Jun. 29, 1981

[30] Foreign Application Priority Data

Jul. 8, 1980 [GB] United Kingdom ............... 8022369

[51] Int. Cl.⁴ ............................................. A23F 5/50
[52] U.S. Cl. .................................. 426/387; 426/475; 202/186; 203/87
[58] Field of Search .................. 426/387, 475; 203/87; 202/186

[56] References Cited

U.S. PATENT DOCUMENTS

| | | | |
|---|---|---|---|
| 2,479,745 | 8/1943 | Homiller et al. | 426/387 |
| 2,513,813 | 7/1950 | Milleville | 426/387 |
| 3,065,085 | 11/1962 | Cherico | 426/387 |
| 3,244,530 | 4/1966 | Byer et al. | 426/387 |
| 3,248,233 | 4/1966 | Brent et al. | 426/387 X |
| 4,281,023 | 7/1981 | Pyres | 426/387 X |

Primary Examiner—Joseph Golian
Attorney, Agent, or Firm—Linn I. Grim; Daniel J. Donovan

[57] ABSTRACT

A process for the condensation of a volatile-rich vapor stream produced by a stripping operation from a vegetable or fruit product or the extract thereof, which comprises the steps of:
(i) condensing a major proportion of the water present in the vapor stream using a surface condenser with water as a coolant;
(ii) subjecting the condensate of step (i) to further cooling in a heat-exchanger using water at a lower temperature than that of step (i) as the coolant; and
(iii) contacting the cooled condensate from step (ii) with the vapor stream issuing from the condenser of step (i) in a countercurrent absorption column.

The process is particularly applicable to the condensation of a volatile-rich water vapor stream containing coffee volatiles.

6 Claims, 1 Drawing Figure

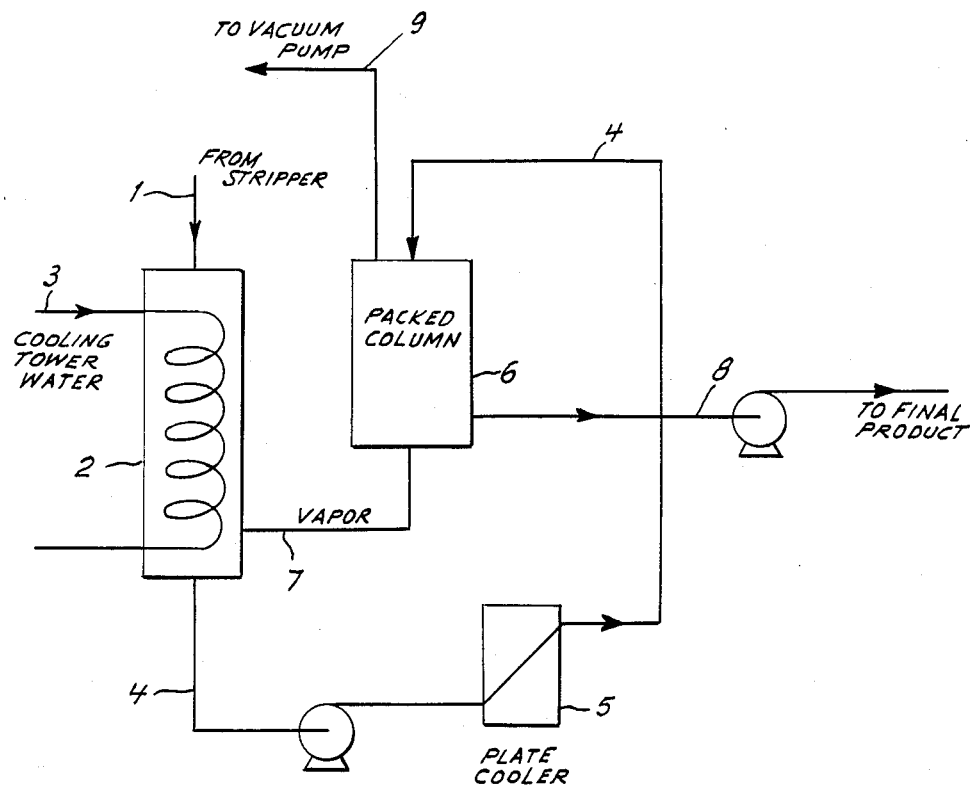

PROCESS FOR THE CONDENSATION OF A VOLATILE-RICH VAPOR STREAM

DESCRIPTION

1. Technical Field

The present invention relates to an improved process for the condensation of a volatile-rich water vapor stream produced by steam- or evaporative-stripping methods from, in particular, roasted coffee or its aqueous extracts. Volatile-rich in this context means that the volatile components are still only present in relatively small amounts.

2. Background

The condensation of a water vapor stream containing volatile components is necessarily a three-step process:

(a) the condensation of the greater proportion of the water vapor present to a liquid aqueous phase, or condensate at a temperature corresponding to the pressure of the gaseous phase in the condensing phase. Some of the volatile components may become present in the liquid phase, according to their partition coefficients between a liquid and gaseous phase, (b) cooling of the above condensate to a lower temperature, determined by the temperature of the coolant used in the condensing system, heat transfer characteristics and size, (c) approach to equilibration of these volatile components between the liquid and gaseous phases determined by their partition coefficients at the temperature of the cooled condensate.

In step (a), latent heat, primarily that of the water, is removed; whilst in step (b), sensible heat only is removed, which will be a small fraction of the former.

It has been conventional to effect all three steps within a surface condenser, which if water (as commonly used as the coolant), is chilled water, obtained by refrigeration means. This process, however, suffers from a number of disadvantages as follows:

(i) expensive chilled water is used to remove both the latent heat and sensible heat.

(ii) the temperature of the condensate does not fall to that of the incoming coolant (unless an extremely large surface area of condenser is provided). The equilibration of the volatile components between the gaseous and liquid phases occurs therefore at a temperature which is substantially higher than the temperature of the coolant. A substantial proportion of the volatile compounds may therefore be lost, particularly if the volume of the gaseous phase is large. The gaseous phase may also comprise non-condensible gases such as air, carbon dioxide originally present in the vapor stream being condensed.

DISCLOSURE OF INVENTION

We have now developed a process for the condensation of a volatile-rich water vapor stream, arising from a stripping process of roasted coffee or its extracts, in which the individual steps (a), (b), (c) above of the condensation are physically separated, and thus each can be independently optimized, thereby overcoming the main disadvantage of the conventional system described below. It is generally the objective of such a condensation system to maximize the recovery of volatile compounds present in such vapor streams. Of course, refrigerants (such as liquid ammonia) may be used in a conventional system, to provide good recovery of volatile substances, resulting from the much lower temperatures used, but this is even more expensive, and not necessarily required or desirable. It is the object of this invention to optimise the recovery of volatile substances using only water as the coolants, at temperatures above 0° C., i.e., not forming frosts in the condensers.

Surface condensers are used, generally in a single stage; other types of condensers such as jet condensers are not suitable since the condensate would be diluted with further water. This process is of particular application to and utility with water vapor streams arising from roasted coffee and its extracts as described in the literature. It may also be used with advantage for vapor streams carrying volatile substances from stripping operations of various vegetable and fruit products and the extracts thereof.

Accordingly, the present invention provides a process for the condensation of a volatile-rich vapor stream produced by a stripping operation from a vegetable or fruit product of the extracts thereof, which comprises the steps of:

(i) condensing a major proportion of the water present in the vapor stream using a surface condenser with water as a coolant;

(ii) subjecting the condensate of step (i) further cooling in a heat-exchanger using water at a lower temperature than that of step (i) as the coolant, and (iii) contacting the cooled condensate from step (ii) with the vapor stream issuing from the condenser of step (i) in a countercurrent absorption column.

The volatile-rich water vapor streams to be condensed in this matter, are typically those containing coffee volatiles as described in our British Pat. No. 1,563,230.

Aromatic volatile constituents are stripped together with water from an aqueous coffee extract by evaporation, for example, using an evaporator of the film type. The evaporative stripping of the volatile flavorful components from an aqueous coffee extract may be effected, for example, in an evaporation zone under conditions such that an absolute pressure ranging from 16 to 20 inches of mercury is maintained and 5 to 15% of the water in the aqueous coffee extract is vaporized, the water vapor containing the stripped flavorful coffee components. The controlling factors with respect to the quantity of volatile components which are evaporatively stripped from the extract are the relative volatility of the components and the percentage of water evaporated from the extract. The temperature in the evaporation zone at which the volatile components are evaporatively stripped is relatively unimportant with respect to the total quantity of flavorful compounds removed from the extract, but should desirably be maintained below the temperature at which deterioration of the flavorful components would occur.

In carrying out the process of this invention the condensation in step (i) of the vapor stream (which will be at a temperature corresponding to the pressure in the evaporating zone, i.e., generally under vacuum, and therefore at a temperature below 100° C.), is effected in a surface condenser which may be cooled with cooling tower water, e.g., water at a temperature of about 27° C., which will, however, depend upon the time of the year, and climatic conditions. In step (ii) of the process, the condensate issuing from step (i) is cooled, for example, using chilled water from a refrigeration process in a countercurrent heat exchanger, such as a plate cooler.

The condensate is cooled to a temperature of from 1° C.–20° C. in this stage, and preferably between 3°–12° for coffee volatiles.

The cooled condensate issuing from step (ii) and the vapor stream issuing from step (i) are then contacted in a countercurrent absorption column in step (iii) of the process of the invention. In this step, volatile components remaining in the vapor stream are absorbed into the condensate. The absorption column may be of any suitable type for contacting liquid and gaseous streams, e.g., a vertical column filled with Rashig rings in which the liquid streams enters from the top and the gaseous stream enters at the bottom.

The process of the present invention possesses the following advantages over the conventional volatile recovery system using only a surface condenser:

(i) low cost tower water can be used to remove latent heat during the condensation of the water vapor;
(ii) chilled water is only needed to remove sensible heat during the cooling of the condensate;
(iii) the use of a high efficiency countercurrent heat exchanger for the cooling of the condensate enables the condensate temperature to approach closely that of the available coolant; and
(iv) the use of an absorption column allows the volatile compounds remaining in the vapor issuing from step (i) to approach closely equilibrium with the volatile-rich condensate at the lowest possible temperature.

BRIEF DESCRIPTION OF THE DRAWING

The accompanying drawing illustrates schematically the apparatus used in carrying out the process of the invention.

BEST MODE FOR CARRYING OUT THE INVENTION

The preferred process of the present invention will be further described with reference to the accompanying drawing.

A vapor stream 1 produced by a coffee extract stripper (not shown) is passed to a surface condenser 2 which is cooled by the passage therethrough of a stream 3 of cooling tower water of temperature sufficient to cause condensation of the major part of water vapor. The condensate stream 4 issuing from the condenser 2 is further cooled in a plate cooler 5, cooled using chilled water, to a temperature at least less than 20° C. The cooled condensate stream 4 is then passed on to the top of an absorption column 6 which is packed which glass Raschig rings (not shown). The vapor stream 7 issuing from the condenser 2 at a temperature according to the pressure in the evaporating zone is passed to the bottom of the column 6, thus achieving the desired countercurrent flow. The cooled condensate stream 4 absorbs the volatile constituents from the vapor stream and an enriched cooled condensate stream 8 issues from the bottom of the condenser. The absorption column 6 is vented via line 9 to the atmosphere through the vacuum pump (not shown).

The present invention will be further described with reference to the following example.

EXAMPLE

A water vapor stream produced from a coffee extract evaporative stripper was condensed, (1) using the preferred process of the present invention, and (2) using the conventional process with only a surface condenser and chilled water.

Operating conditions were as follows:

| Process of Present Invention | Operating Temperatures |
| --- | --- |
| Cooling tower water in condenser | 29° C. |
| Exit condensate and water vapor stream from condenser | 35° C. |
| Chilled water to plate cooler | 11° C. |
| Condensate from plate cooler | 12° C. |
| Condensate from absorption column | 12° C. |

THROUGHPUTS

Final Cooled Condensate, 20 kg./hrs.

The absorption column used was about 100 cms. high and 9 cms. diameter, filled with 7×7 mm. glass Rashig rings.

| Conventional Process | Operating Temperatures |
| --- | --- |
| Temperature of chilled water to condenser | 11° C. |
| Temperature of leaving condensate | 23° C. |

The condenser used was the same as used for testing invention, and throughput of condensate was approximately the same.

The percentage recovery of volatile substances from the water vapor stream, the initial content of which was substantially the same, in each experiment, was found to be as follows,

|  | In Vapor | In Condensate | Lost |
| --- | --- | --- | --- |
| Process of Present Invention | 100% | 86.9% | 13.1% |
| Conventional Process | 100% | 73.9% | 26.1% |

The volatile substances not condensed are lost to atmosphere or in the sealing water of the vacuum pump. The percentage recovery of volatile substances in condensate was determined by a GC headspace method, assessing a total count from the chromatograms for the volatiles in the original extract and in the stripped extract (and therefore that in the entering vapor to the condensing system), and in the final condensates, all referred to the same weight of coffee solids in the original extract.

It is clear that the percentage recovery of volatiles in condensate has been markedly increased compared with a conventional process. The conventional process uses expensive chilled water at 11° C. In contrast, the process of the invention has used as cooling water, firstly inexpensive cooling tower water, and then a small amount of chilled water in the separate cooler. The ratio of the total cooling load is then about 90% for the tower water and 10% for the chilled water.

We claim:

1. A process for the condensation of a volatile-rich vapor stream produced by a stripping operation from a vegetable or fruit product or the extract thereof, which comprises the steps of:
   (i) condensing a major proportion of the water present in the vapor stream using a surface condenser cooled with cooling tower water at a temperature of about 27° to 30° C. to remove the latent heat of vaporization; said cooling tower water being sufficient to handle 90% of the total cooling requirement;

(ii) subjecting the condensate of step (i) to further cooling in a heat-exchanger using chilled water having a temperature in the range of from 1° to 12° C., said chilled water being sufficient to handle 10% of the total cooling requirement; and (iii) contacting the cooled condensate from step (ii) with the remaining vapor issuing from the condenser of step (i) in a countercurrent absorption column to remove the sensible heat of vaporization and maximize recovery of volatile compounds present in said vapor stream.

2. A process as claimed in claim 1 wherein the volatile-rich vapor stream is produced from an aqueous coffee extract by evaporation using an evaporator of the film type.

3. A process as claimed in claim 2 wherein the evaporation is effected under conditions such that an absolute pressure of from 16 to 20 inches of mercury is maintained and 5 to 15% of the water in the aqueous coffee extract is vaporized.

4. A process as claimed in claim 1 wherein the heat exchanger is a plate cooler.

5. A process as claimed in any one of the preceding claims werein the cooled condensate from step (ii) is passed to the bottom of a countercurrent absorption column and the vapor stream issuing from step (i) is passed to the top of the countercurrent absorption column.

6. A process as claimed in claim 5 wherein the absorption column is a vertical column filled with Rashig rings.

* * * * *